United States Patent [19]

Tanaka

[11] Patent Number: 4,772,833

[45] Date of Patent: Sep. 20, 1988

[54] FEEDBACK CONTROL SYSTEM FOR PRODUCING PULSE WIDTH MODULATION CONTROL SIGNAL

[75] Inventor: Masato Tanaka, Tokyo, Japan

[73] Assignee: Sony Corporation, Tokyo, Japan

[21] Appl. No.: 75,741

[22] Filed: Jul. 20, 1987

[30] Foreign Application Priority Data

Aug. 19, 1986 [JP] Japan .................................. 61-192122

[51] Int. Cl.$^4$ ........................................... G05B 11/28
[52] U.S. Cl. .................................... 318/599; 318/341; 364/768
[58] Field of Search ................ 318/599, 341; 364/768, 364/771; 331/1 A, 25

[56] References Cited

U.S. PATENT DOCUMENTS 4,179,670 12/1979 Kingsbury ............................. 331/10
4,383,245 5/1983 Cooley et al. ........................ 318/599
4,586,005 4/1986 Crawford ............................ 331/1 A

OTHER PUBLICATIONS

"The Digiphase Synthesizer" by Garry Gillette, paper presented at the 23rd Annual Frequency Control Symposium, 1969.

Primary Examiner—William M. Shoop, Jr.
Assistant Examiner—Saul M. Bergmann
Attorney, Agent, or Firm—Alvin Sinderbrand

[57] ABSTRACT

In a feedback control system for providing a pulse width modulated control signal for feedback controlling a motor or other device in accordance with control error data, control data produced according to the control error data and previously stored rounding error data are added together, and the sum of the control data and rounding error data is in turn rounded off, while the rounding error data is stored in a register, memory, or the like. The pulse width modulated control signal is then produced according to the rounded-off data.

5 Claims, 3 Drawing Sheets

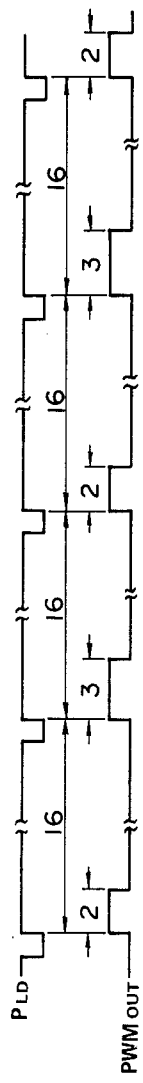
FIG. 5
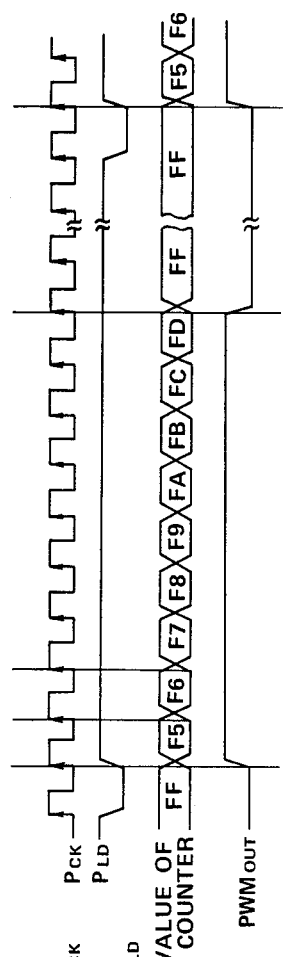
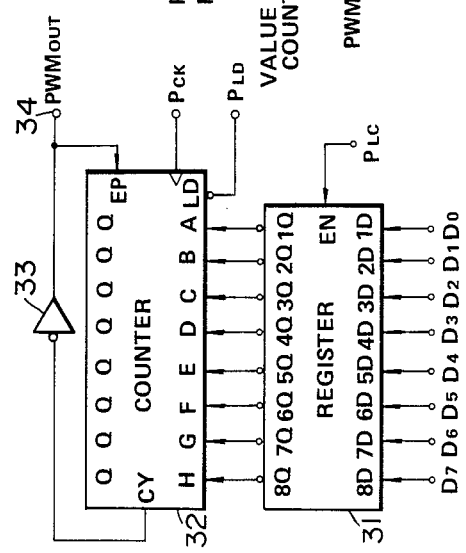
FIG. 2 (PRIOR ART)
FIG. 1 (PRIOR ART)

FEEDBACK CONTROL SYSTEM FOR PRODUCING PULSE WIDTH MODULATION CONTROL SIGNAL

BACKGROUND OF THE INVENTION

1. Field of the Invention

This invention relates to a feedback control system for pulse width modulation (PWM) controlling of the rotation, position, or the like of a motor or other controlled object or device.

2. Description of the Prior Art

Heretofore, digital servo circuits used for motor rotation control and the like, have made use of a PWM driving system which produced a PWM signal for driving a motor or other controlled object in response to control data produced according to control error data. In a digital servo circuit according to the prior art, duty data corresponding to control error data from a motor or other object to be controlled is supplied to a duty register which provides complement data to preset a counter each time the latter receives a load pulse, whereupon, the preset counter counts a master clock pulse, starting from the preset value, and provides a carry output from which the PWM control signal can be derived.

In the above described digital servo circuit according to the prior art, the frequency of the master clock pulse to be counted by the preset counter is dependent on the desired resolution of the PWM control signal and the carrier frequency thereof. Thus, the frequency of the master clock pulse can be reduced without reducing the resolution of the PWM control signal only by undesirably reducing the carrier frequency. On the other hand, if the carrier frequency is set at a desirable value, the master clock pulse frequency may become very high so that it becomes difficult to embody the digital servo circuit in an integrated circuit configuration.

OBJECTS AND SUMMARY OF THE INVENTION

Accordingly, it is an object of this invention to provide a digital servo circuit that avoids the above described disadvantages of the prior art.

More specifically, it is an object of the present invention to reduce the master clock pulse frequency that needs to be supplied for the generation of a PWM control signal without reducing the accuracy of the control.

Another object of the present invention is to permit an increase of the carrier frequency of the PWM control signal without increasing the master clock pulse frequency.

A further object of the present invention is to permit reduction of power consumption and fabrication of the digital servo circuit as an integrated circuit to be readily realized by permitting reduction of the clock frequency and/or increase of the carrier frequency.

In accordance with an aspect of the present invention, control data produced according to a control error signal is added to a previously stored rounding error, and the resultant data, that is, control data plus rounding error, is in turn rounded off, while the rounding error is stored in a register, memory or the like. A PWM control signal is then produced in accordance with the rounded-off control data.

The above, and other objects, features and advantages of the invention, will become apparent from the following detailed description which is to be read in conjunction with the accompanying drawings in which corresponding parts are identified by the same reference numerals in the several views.

BRIEF DESCRIPTION OF THE DRAWINGS

FIG. 1 is a block diagram showing essential components of a prior art digital servo circuit;

FIG. 2 is a timing chart to which reference will be made in explaining the operation of the prior art digital servo circuit of FIG. 1;

FIG. 5 is a timing chart to which reference will be made in explaining the operation of the embodiment of the invention shown on FIGS. 3 and 4.

DESCRIPTION OF THE PREFERRED EMBODIMENT

Figure 3:
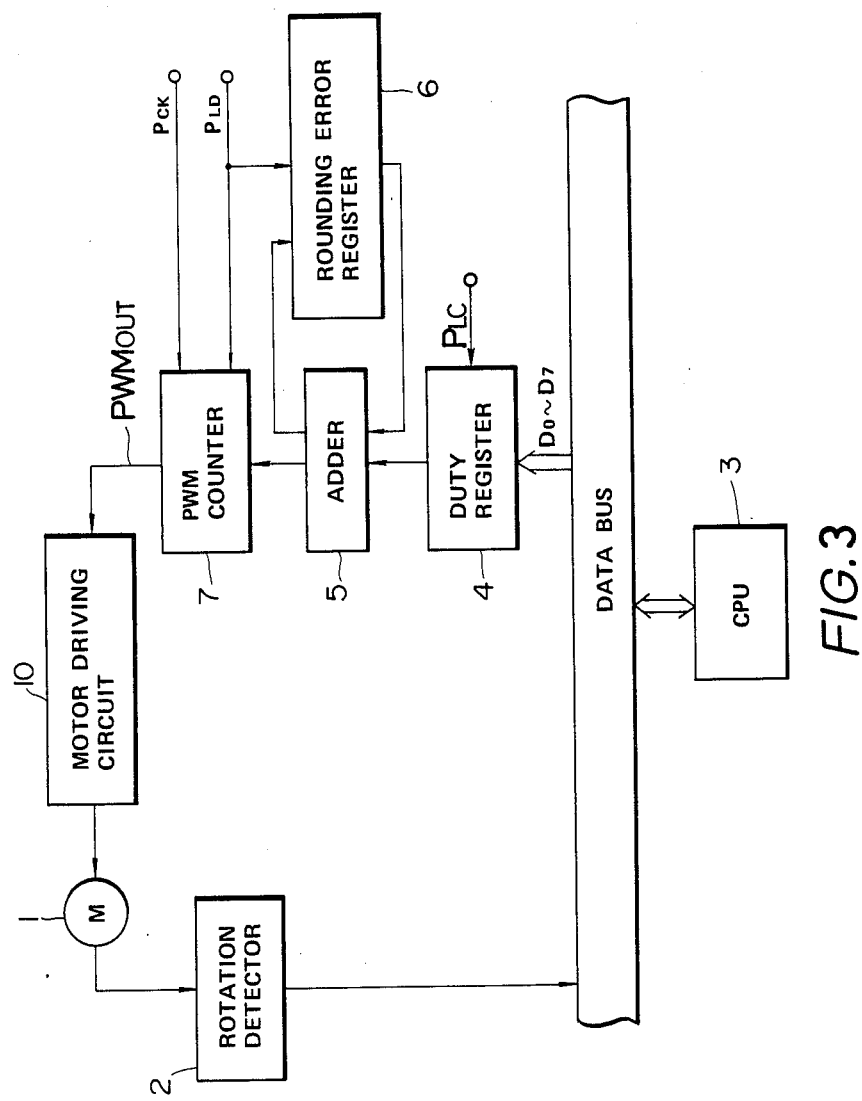
FIG. 3 is a block diagram showing an embodiment of the present invention applied to a servo circuit of a motor.

Initially, a digital servo circuit according to the prior art will be described in detail with reference to FIGS. 1 and 2 so that the problems arising therein, and which are avoided by the present invention, can be readily understood. In the digital servo circuit according to the prior art as illustrated on FIG. 1, control data for the feedback or servo control of a motor or other controlled object are supplied from a microcomputer or central processing unit (not shown) as duty data $D_0$ to $D_7$ through a data bus to input terminals 1D to 8D, respectively, of a duty register 31 in accordance with control error data provided from the motor (not shown) or other controlled object.

Such duty data is used to determine the duty ratio of a PWM signal for feedback control of the controlled object. More specifically, each time a latch pulse $P_{LC}$ is supplied to an enable terminal EN of duty register 31, the latter latches the duty data $D_0$ to $D_7$, for example, representing hexadecimal data "OA", and supplies the complement data, that is, data representing hexadecimal data "F5" in the example given, from output terminals 1Q to 8Q of register 31 to preset input terminals A to H, respectively, of an 8-bit preset counter 32. Every time a load pulse $P_{LD}$ is supplied to a load input terminal LD of counter 32, the latter is preset to the complement data supplied from duty register 31. At the same time, counter 32 begins to count up master clock pulses $P_{CK}$ supplied to its clock input terminal, as shown in FIG. 2, beginning from the preset value "F5", and supplies a carry output from a terminal CY through an inverter 33 to an enable terminal EP of counter 32 and to an output terminal 34 as a PWM control signal $PWM_{OUT}$ for the controlled motor or other object (not shown). The above operations are performed repeatedly for feedback control.

In the above described digital servo circuit according to the prior art, if the resolution of the PWM control signal $PWM_{OUT}$ is set to 8 bits, for example, 1/256 step, so that if carrier frequency of the PWM control signal $PWM_{OUT}$ is set to 32 KHz, a predetermined digital servo operation can be obtained by supplying, to the clock input terminal of the preset counter 32, the master clock pulse $P_{CK}$ with a frequency of 8.192 MHz, which is 256 times the frequency 32 KHz of the load pulse $P_{LD}$ supplied to the load input terminal LD of the preset counter 32.

Thus, in the above described prior art digital servo circuit, the frequency of the master clock pulse to be supplied to the preset counter 32 is determined by the resolution of the PWM control signal and the carrier frequency. If it is desired to reduce the frequency of the master clock pulse $P_{CK}$ without reducing the resolution of the control signal $PWM_{OUT}$, it is necessary to reduce the carrier frequency. Conversely, if, for example, the carrier frequency is set to 256 KHz in order to reduce the size of a filter provided in a drive circuit of the controlled motor or other object or device, the master clock pulse frequency is extremely increased to 65.5 MHz, so that it becomes difficult to produce an integrated circuit.

Referring now to FIG. 3, it will be seen that an embodiment of the present invention which avoids the foregoing problems is there shown applied to the data feedback control of a motor 1 constituting the controlled object or device, and being driven by a motor driving circuit 10. A rotation detector 2 detects the rotational speed of the motor 1 and supplies corresponding rotational speed data to a microcomputer or central processing unit (CPU) 3 through a data bus 11. The microcomputer 3 generates control error data corresponding to the difference between a desired rotational speed and the rotational speed represented by the data from detector 2 and provides duty data $D_0$ and $D_7$ of L (L=8) bits for producing a PWM signal according to the control error data. The 8-bit duty data $D_0$ to $D_7$ are supplied to a duty register 4 through the data bus 11.

Figure 4:
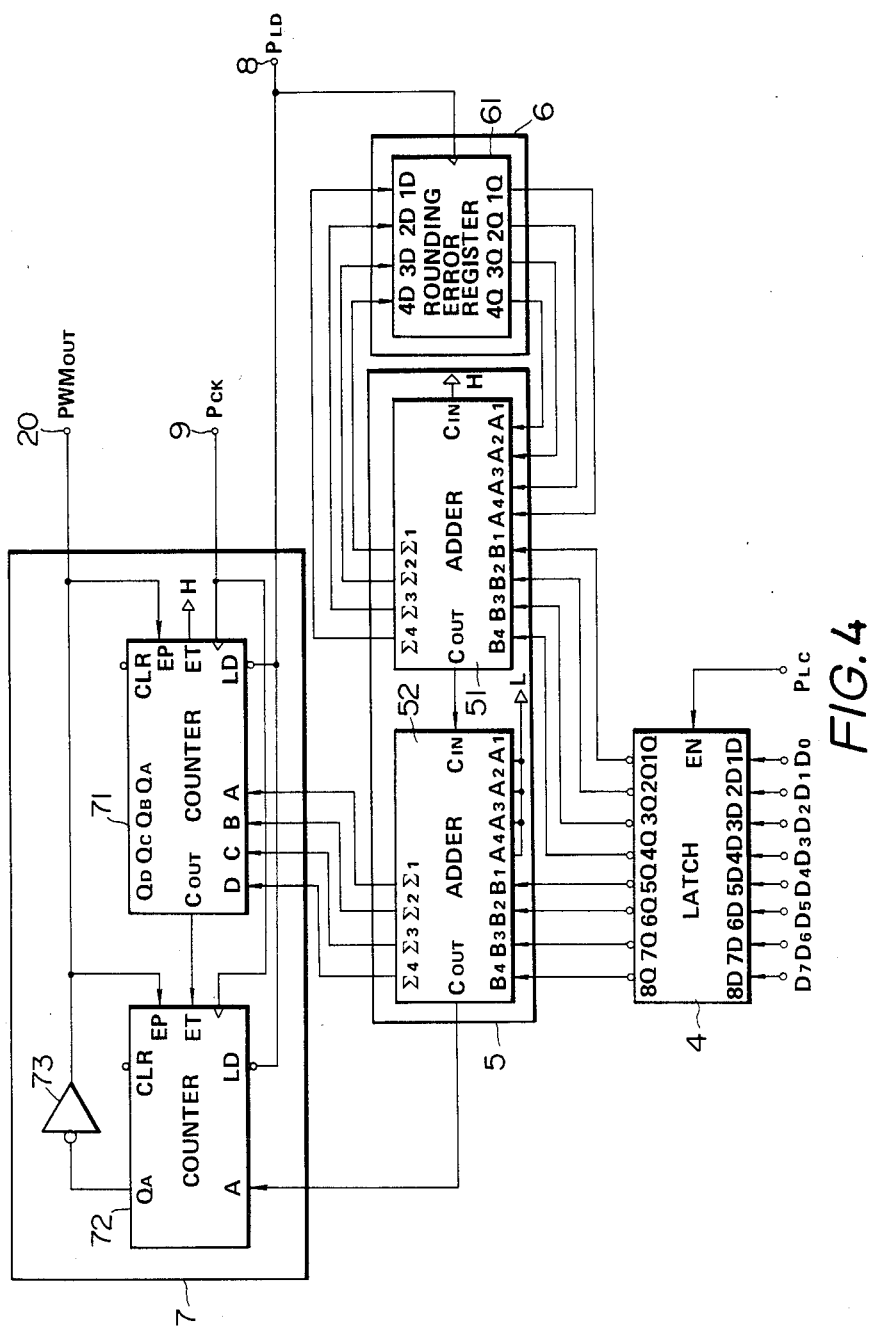
FIG. 4 is a block diagram showing a specific example of the circuit construction of an essential portion of the embodiment shown on FIG. 3.

As shown more particularly on FIG. 4, duty register 4 receives the duty data $D_0$ to $D_7$ at input terminals 1D to 8D, respectively, and latches the duty data in response to a latch pulse $P_{LC}$ supplied at a predetermined repetition frequency to an enable terminal EN. Further, in response to such latch pulse $P_{LC}$, duty register 4 provides the complement of the duty data at output terminals 1Q to 8Q for transmission to a data adder circuit 5.

In the embodiment of FIG. 4, data adder 5 is shown to consist of two adders 51 and 52. The adder 51 is a 4-bit adder which, at input terminals $B_1$, $B_2$, $B_3$ and $B_4$, receives the lower M-bits (for example, M=4) of complement data $D_M$ from output terminals $Q_1$, $Q_2$, $Q_3$ and $Q_4$, respectively, of duty register 4. At its add data input terminals $A_1$, $A_2$, $A_3$ and $A_4$, adder 51 receives output data from output terminals $4_Q$, $3_Q$, $2_Q$ and $1_Q$, respectively, of a 4-bit rounding error register 6. The sum output data from output terminals $\Sigma_4$, $\Sigma_3$, $\Sigma_2$ and $\Sigma_1$ of adder 51 are supplied to data input terminals 1D, 2D, 3D and 4D, respectively, of rounding error register 6, and a carry output of adder 51 is supplied from an output terminal $C_{OUT}$ thereof to a carry input terminal $C_{IN}$ of adder 52. A carry input terminal $C_{IN}$ of adder 51 is maintained at the logic level "H".

The adder 52, which is also a 4-bit adder, is supplied, at its input terminals $B_1$, $B_2$, $B_3$ and $B_4$, with the upper N-bits (for example N=4) of the complement data $D_N$ from the output terminals 5Q, 6Q, 7Q and 8Q, respectively, of duty register 4. All of the add data input terminals $A_1$, $A_2$, $A_3$ and $A_4$ of adder 52 are held at logic level "L", and the carry output from adder 51 is added to the upper 4-bit complement data $D_N$ in adder 52. The sum output data from output terminals $\Sigma_1$, $\Sigma_2$, $\Sigma_3$ and $\Sigma_4$ of adder 52 are supplied to preset data input terminals A,B,C and D, respectively, of an N-bit (for example, N=4) preset counter 71 included in a PWM counter 7. Further, a carry output is supplied from a carry output terminal $C_{OUT}$ of adder 52 to a preset data input terminal A of a one-bit preset counter 72 also included in the PWM counter 7.

The rounding error register 6 is, for example, constituted by a 4-input D type flip-flop 61. A PWM carrier signal, for example, at a frequency of 256 KHz, is supplied as a clock pulse $P_{LD}$ from a signal input terminal 8 to a clock input terminal of flip-flop 61, and the sum output data from 4-bit adder 51 is latched in flip-flop 61 at each such clock pulse $P_{LD}$.

Further, in the PWM counter 7, the PWM carrier signal having the frequency of 256 KHz is supplied, as a load clock pulse $P_{LD}$, from signal input terminal 8 to load input terminals LD of the preset counters 71 and 72, and a master clock pulse $P_{CK}$, for example, at a frequency of 4.096 MHz, is supplied from a signal input terminal 9 to clock inputs of counters 71 and 72. The output data from terminals $\Sigma_1$, $\Sigma_2$, $\Sigma_3$ and $\Sigma_4$ of 4-bit adder 52 is preset in counter 71 at each load clock pulse $P_{LD}$, and the master clock pulses $P_{CK}$ are counted up by counter 71 from the preset value. The carry output of 4-bit preset counter 71 is supplied from a carry output terminal $C_{OUT}$ thereof to an enable terminal ET of the one-bit preset counter 72. An enable terminal ET of 4-bit preset counter 71 is shown to be held at logic level "H". The carry output of one-bit preset counter 72 is supplied from a carry output terminal $Q_A$ through an inverter 73 to an enable terminal EP of counter 72 and to an enable terminal EP of 4-bit preset counter 71. Further, the output of inverter 73 is supplied as the pulse width modulated control signal $PMW_{OUT}$ to a signal output terminal 20 for transmission therefrom to the motor driving circuit 10 (FIG. 3). The preset counter 72 performs its operations repeatedly. When a signal is supplied to the enable terminal EP of counter 72, the carry signal issuing from terminal $Q_A$ is controlled. When the carry output signal from 4-bit preset counter 71 is supplied to the enable terminal ET of counter 72, carry output from terminal $Q_A$ is not controlled.

In the above described embodiment of the invention, with respect to the 8-bit duty data $D_0$ to $D_7$ which are temporarily stored in duty register 4, 4-bit adder 51 of data adder 5 adds the lower 4-bit data $D_M$ to the rounding error data stored in rounding error register 6, and 4-bit adder 52 adds the carry output from adder 51 to the upper 4-bit data $D_N$. As a result, upper 4-bit data which has been rounded off is obtained from the output terminals $\Sigma_1$, $\Sigma_2$, $\Sigma_3$ and $\Sigma_4$ of adder 52. The sum output from terminals $\Sigma_1$, $\Sigma_2$, $\Sigma_3$ and $\Sigma_4$ of adder 51 is stored in the rounding error register 6. For example, if the supplied 8-bit duty data $D_0$ to $D_7$ represents hexadecimal data "28", 4-bit adder 52 alternately provides at its terminals $\Sigma_1$, $\Sigma_2$, $\Sigma_3$ and $\Sigma_4$ complement data representing hexadecimal data "2" and "3" in response to the supply of a carry output from adder 51 to terminal $C_{IN}$ of adder 52. The complement data provided from adder 52 are preset in the PWM counter 7 for counting master clock pulses $P_{CK}$. Thus, the duty ratio is alternately changed between 2/16 and 3/16, as shown in FIG. 5, so that a PWM control signal $PWM_{OUT}$ substantially having the duty ratio of 2.5/16, that is, 40/256, can be obtained.

It will be understood that, in the above described feedback control system according to an embodiment of the present invention, a preset counter device 7, which counts clock pulses, is preset at a predetermined interval with duty data produced on the basis of control error data, thereby providing a PWM servo output with a duty ratio corresponding to the duty data noted above.

By way of summary, in the feedback control system according to the invention, duty register 4 temporarily stores L-bit (L=M+N) duty data produced on the basis of the control error data, and is associated with an adder circuit 5 comprised of M-bit adder 51 and N-bit adder 52, and an M-bit rounding error register 6 for temporarily storing the M-bit data of the sum output of the data adder 51 for each load pulse $P_{LD}$. The data adder 51 adds the M-bit data temporarily stored in the rounding error register 6 and the lower M bits of the L-bit duty data temporarily stored in the duty register 4. Clock pulses $P_{CK}$ are counted from the rounded-off N-bit data at the output of the data adder 52; which are preset in the preset counter 7 for each load pulse, thereby the PWM signal.

In the motor servo feedback control system according to the present invention, the M-bit data stored in the rounding error register 6 and the lower M-bits of the data stored in the duty register 4 are added together, and the resulting carry output is added, in the adder 52, to the upper N-bits of the data stored in the duty register 4, whereupon the PWM signal is produced according to the resulting rounded off upper N-bit data, while the lower M-bit data are again stored in the rounding error register 6. It will be appreciated that the N-bit output of the adder 52 represents the rounded-off sum of the upper N-bit data $D_N$ and the lower M-bit data $D_M$ of the complement of the duty data. With the foregoing arrangement, it is possible to reduce the clock frequency supplied for the generation of the PWM signal without reducing the accuracy of control. Further, it is possible to increase the carrier frequency of the PWM control signal, that is, the frequency of the load clock pulse $P_{LD}$, without increasing the clock frequency.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A motor servo feedback control system for producing a pulse width modulated control signal for controlling a characteristic of a motor in accordance with error data representing deviation of said characteristic from a predetermined value, comprising:
   means for generating control data corresponding to said error data and being constituted by a plurality of upper bits and a plurality of lower bits;
   control data latch means for temporarily holding said upper and lower bits of said control data;
   rounding error data latch means for temporarily holding rounding error data constituted by a plurality of bits equal in number to said lower bits;
   first adding means for adding together said lower bits of the data temporarily held in said control data latch means and said rounding error data in said rounding error data latch means and supplying the resultant of said adding to said rounding error data latch means as said rounding error data to be temporarily held therein, said first adding means further having a carry output;
   second adding means for adding said carry output to said upper bits of the data temporarily held in said control data latch means for providing, as a resultant, rounded off upper bits of said control data; and
   pulse width modulated control signal generating means receiving said rounded-off upper bits of control data from said second adding means for producing in accordance therewith said pulse width modulated control signal for controlling said characteristic of the motor.

2. A motor servo feedback control system according to claim 1; in which said pulse width modulated control signal generating means includes preset counter means for counting input clock pulses, and means for periodically presetting said counter means with said rounded-off upper bits of control data from said second adding means so that said counter means counts said clock pulses from said rounded-off upper bits of control data periodically preset therein.

3. A motor servo feedback control system for producing a pulse width modulated control signal for controlling a characteristic of a motor in accordance with error data representing deviation of said characteristic from a predetermined value, comprising:
   means for generating L-bit duty data corresponding to said error data;
   L-bit duty register means temporarily storing said L-bit duty data;
   adder means having a first sum output of lower M-bit data and a second sum output of upper N-bit data;
   M-bit rounding error register means responsive to a loading pulse for temporarily storing the lower M-bit data of said first sum output of said adder means;
   said adder means being operative to add said M-bit data temporarily stored in said rounding error register means and the lower M-bits of said L-bit duty data temporarily stored in said duty register means so as to provide said first sum output therefrom, said adder means further being operative to round-off the upper N-bits of said L-bits duty data in accordance with said first sum output so as to provide said second sum output therefrom; and
   pulse width modulated control signal generating means including preset counter means periodically preset with the upper N-bit data of said second sum output of said adder means to that said counter means counts clock pulses from said N-bit data periodically preset therein, and in which L=M+N.

4. A motor servo feedback control system according to claim 3; in which said adder means includes a first M-bit adder for adding said lower M-bits of said duty data stored in said duty register means and said M-bit data temporarily stored in said rounding error data register means, said first adder having said M-bit first sum output supplied to said rounding error register means and a carry output determined by said first sum output, and a second adder for adding said upper N-bits of said duty data stored in said duty register means and said carry output from said first adder, said second adder having said upper N-bit second sum output supplied to said preset counter means.

5. A motor servo feedback control system according to claim 4; in which said preset counter-means includes a first N-bit preset counter preset periodically with said upper N-bit second sum output from said second adder, and a second one-bit preset counter enabled by a carry output from said first counter and being preset periodically with a carry output of said second adder.

* * * * *